Oct. 23, 1923.

J. S. WALTON

TIRE

Filed May 11, 1923

1,471,580

Inventor
Joseph S. Walton

By L. G. Bruce
Attorney

Patented Oct. 23, 1923.

1,471,580

UNITED STATES PATENT OFFICE.

JOSEPH S. WALTON, OF LOS ANGELES, CALIFORNIA.

TIRE.

Application filed May 11, 1923. Serial No. 638,236.

*To all whom it may concern:*

Be it known that I, JOSEPH S. WALTON, a citizen of the United States, residing at Los Angeles, California, have invented certain new and useful Improvements in Tires, of which the following is a specification.

This invention relates to improvements in tires and more particularly to an improved puncture-proof tire adapted especially for motor vehicles.

The primary object of the invention is to provide a tire possessing the resiliency of the ordinary pneumatic tires without being subjected to punctures and the like.

A further object of the invention is to provide an improved inner tube or lining member adapted to take the place of the ordinary pneumatic tube now in general use.

With the foregoing objects outlined and with other objects in view which will appear as the description proceeds, the invention consists in the novel features hereinafter described in detail, illustrated in the accompanying drawing, and more particularly pointed out in the appended claims.

Referring to the drawing.

Figure 1:
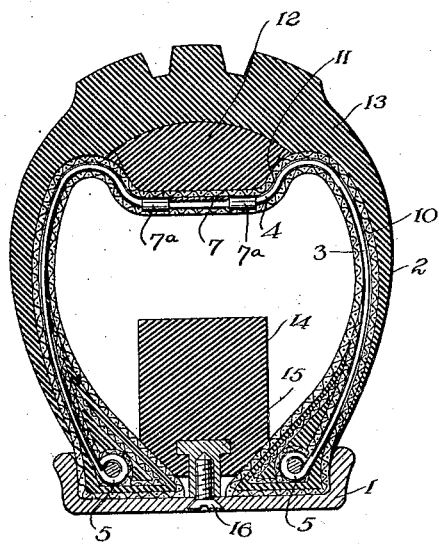
Figure 1 is a transverse sectional view of a portion of one form of the improved tire.
Figure 2:
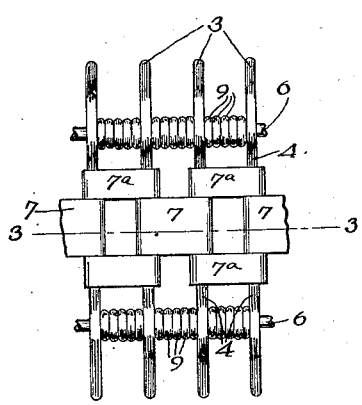
Fig. 2 is a plan view of the skeleton frame of the tire.
Figure 3:
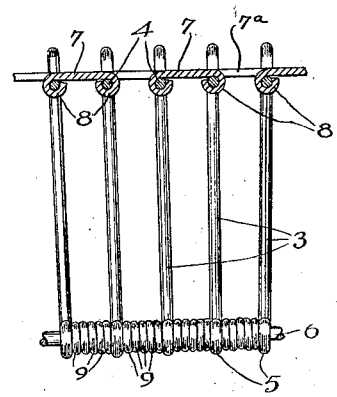
Fig. 3 is a longitudinal vertical sectional view taken on line 3—3 of Fig. 2.

In the embodiment of the invention illustrated in Figures 1 to 3 inclusive, 1 designates a rim on which is mounted the tire 2. This tire is an improvement over the tire disclosed in my prior Patent No. 1,300,063 and it consists of a skeleton frame-work formed of substantially U-shaped wire elements 3, each of which has its cross head bended into channel shape as shown at 4. The ends of the elements 3 are provided with loops or eyes 5 which receive cables or wires 6 employed in securing the elements together. The channel-shaped portions 4 of the elements are flexibly connected together by means of central broad hinge elements 7 and narrow side hinge elements 7ª. Each of the hinge elements has two curled portions 8 at its end, which form the eyes of the hinges. The elements 7 and 7ª may be readily struck from sheet metal or the like and each element connects two wire elements 3. The ends of the elements 3 are spaced apart by washers 9 of any suitable construction.

This skeleton frame is capable of distorting in various directions and returning to its original position under the inherent resiliency of the material from which the frame is formed. The skeleton frame is embedded in vulcanized fiber 10 and this provides a channel-shaped recess 11 around the periphery of the skeleton frame to receive a key-stone cushion 12 of hard rubber, which is in the form of a band encircling the skeleton frame. The skeleton frame and the member 12 are arranged within a casing 13, which in Figure 1 is vulcanized to the member 12 and to the cover 10 of the skeleton frame.

The order to prevent too great distortion of the spring elements 3 or of the skeleton frame, a buffer 14 is arranged within the skeleton frame and this buffer will extend around the entire tire. This member is provided with a securing element 15 preferably of T-shaped cross section and adapted to receive screws 16, which secure the same to the rim 1.

Figure 4:
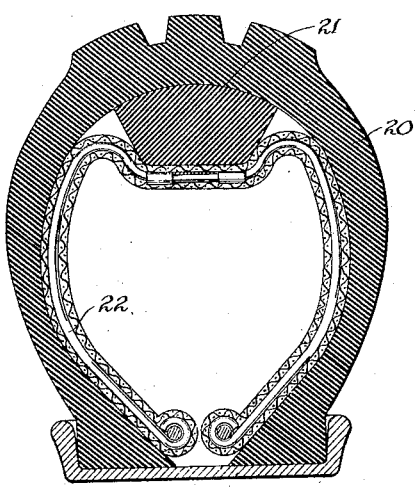
Fig. 4 is a transverse sectional view of a modified form of tire.

In the construction shown in Figure 4, I have combined my resilient skeleton frame with an ordinary tire casing 20 and in the channel-shaped recess of the frame I arrange a cushion element 21. In dismantling this construction the skeleton frame 22 may be removed from the casing in a manner similar to the removal of an ordinary pneumatic tube.

From the foregoing it is believed that the construction, operation and advantages of the invention may be readily understood by those skilled in the art, and it is apparent that various changes may be made in the details disclosed without departing from the spirit of the invention as expressed in the claims.

What I claim and desire to secure by Letters-Patent is:

1. In a tire, a series of U-shaped spring wire elements arranged side by side and each having its cross head of channel shape, hinge elements flexibly connecting the channel shaped portions of said spring elements, eyes at the ends of the spring elements, cables extending through said eyes, a fibrous covering enclosing said spring elements and hinge elements, a cushion member arranged in the channel-shaped portions of said spring elements, and a casing enclosing said cushion element and the fibrous covering of said spring elements.

2. The tire as claimed in claim 1 in which each of said hinge elements consists of a metal plate provided with curled loops at its ends.

3. A tire as claimed in claim 1 in which said casing is removable from said spring elements and their fibrous covering.

4. A tire as claimed in claim 1 in which the cushion element is of substantially keystone shaped cross section.

5. A tire as claimed in claim 1 including spacing elements arranged on the cables between said wire elements.

In testimony whereof I hereunto affix my signature.

JOSEPH S. WALTON.